(12) United States Patent
Doerr

(10) Patent No.: US 6,832,011 B2
(45) Date of Patent: Dec. 14, 2004

(54) PUSH-PULL THERMOOPTIC SWITCH HAVING SINGLE CONTROL SIGNAL

(75) Inventor: Christopher R. Doerr, Middletown Township, Monmouth County, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 76 days.

(21) Appl. No.: 10/243,205

(22) Filed: Sep. 13, 2002

(65) Prior Publication Data
US 2004/0052441 A1 Mar. 18, 2004

(51) Int. Cl.$^7$ .............................................. G02F 1/035
(52) U.S. Cl. ............................ 385/3; 385/12; 385/15; 385/40
(58) Field of Search ........................... 385/3, 2, 8, 12, 385/14, 15, 16, 27, 31, 39, 40

(56) References Cited

U.S. PATENT DOCUMENTS

| | | | | |
|---|---|---|---|---|
| 4,587,487 A | * | 5/1986 | Zanzucchi | 324/244.1 |
| 4,783,852 A | * | 11/1988 | Auracher | 398/203 |
| 4,893,352 A | * | 1/1990 | Welford | 398/198 |
| 5,253,309 A | * | 10/1993 | Nazarathy et al. | 385/4 |
| 5,303,079 A | * | 4/1994 | Gnauck et al. | 398/182 |
| 5,915,051 A | * | 6/1999 | Damask et al. | 385/16 |
| 6,370,290 B1 | * | 4/2002 | Ball et al. | 385/14 |
| 6,552,838 B2 | * | 4/2003 | Ransijn et al. | 359/245 |
| 2002/0025103 A1 | * | 2/2002 | Thaniyavarn | 385/15 |

* cited by examiner

Primary Examiner—Frank G. Font
Assistant Examiner—K. Cyrus Kianni

(57) ABSTRACT

A push-pull thermooptic interferometer switch can be controlled using only one control lead and one drive signal per switch. Advantageously, using only control signal lead and one electrical driver per switch can greatly reduce the complexity of the electronics needed to drive a switch array. The single control lead push-pull thermooptic interferometer switch can be driven by controllable voltage or current signals. The connections of the control and other signal leads to an array of these switched can be made in a planar manner without the need for crossover paths.

12 Claims, 2 Drawing Sheets

US 6,832,011 B2

PUSH-PULL THERMOOPTIC SWITCH HAVING SINGLE CONTROL SIGNAL

RELATED APPLICATION

Related subject matter is disclosed in my previously filed application entitled "PUSH-PULL THERMOOPTIC SWITCH" by C. R. Doerr, Ser. No. 09/810,135, filed on Mar. 16, 2001, and assigned to the same Assignee.

TECHNICAL FIELD OF THE INVENTION

This invention relates generally to optical communication devices and arrangements, and, in particular, to a push-pull thermooptic switch which is driven from a single control signal.

BACKGROUND OF THE INVENTION

Wavelength Division Multiplexing (WDM) control devices, such as wavelength add-drops (WADs), wavelength selective cross connects (WSCs), and dynamic gain equalization filters (DGEFs), often consist of a demultiplexer and a multiplexer connected by an array of switches. A low-loss, compact, mass-produceable way to make the switches is to use a planar arrangement of thermooptic Mach-Zehnder (M-Z) interferometer switches in silica waveguides.

As discussed in my above-identified patent application, a push-pull thermooptic Mach-Zehnder interferometer switch has several advantages over conventional thermooptic Mach-Zehnder switches, such as reduced power consumption and polarization dependence and constant power dissipation. With reference to FIG. 1, there is shown a push-pull thermooptic Mach-Zehnder interferometer switch as described my above-identified patent application. As shown, each waveguide arm 101 and 102 includes a thermooptic phase shifter. A thermooptic phase shifter is simply a heater, (e.g., 110 and 112) deposited over the waveguide arm (101 and 102, respectively) that causes the refractive index of the waveguide arm material to change via a temperature change when electrical signal (CONTROL 1, CONTROL 2, respectively) is applied to the heater. Usually the two path lengths (i.e., the lengths of arms 101 and 102) between the input coupler 120 and the output coupler 130 are designed to be equal when the thermo-optic phase shifter is undriven, although sometimes there is about a quarter-wavelength element 140 to provide a phase bias in the switch.

Notwithstanding the improvements of my previous push-pull thermooptic Mach-Zehnder interferometer switch, that design required a separate control lead (111, 112) and drive signal [CONTROL 1, CONTROL 2, respectively] for each arm. Since WDM control devices, often consists of a demultiplexer and a multiplexer connected by an array of such push-pull thermooptic interferometer switches, it would be desirable to reduce the number of control leads and drive signals needed to operate each push-pull thermooptic interferometer switch.

SUMMARY OF THE INVENTION

In accordance with the present invention, I have recognized that a push-pull thermooptic interferometer switch can be controlled using only one control lead and one drive signal per switch. Advantageously, using only control signal lead and one electrical driver per switch can greatly reduce the complexity of the electronics needed to drive a switch array. My single control lead push-pull thermooptic interferometer switch can be driven by controllable voltage or current signals. The connections of the control and other signal leads to an array of these switched can be made in a planar manner without the need for crossover paths.

More particularly, my invention is a push-pull driven two-arm thermooptic interferometer switch comprising
 a first two-terminal phase control element to control the optical phase in a first arm, a first terminal of the first phase control element being connected to a fixed electrical signal,
 a second two-terminal phase control element to control the optical phase in a second arm, where a second terminal of the second phase control element is connected to the second terminal of the first phase control element, and
 a single controllable electrical signal applied across the first and second terminals of the second phase control element, wherein the level of the controllable electrical signal controls the optical phase in a first and second arms by controlling the current flow in the first and second arms, respectively.

In one embodiment, the single controllable electrical signal includes a controllable voltage source applied to the second terminal of the second phase control element and a fixed voltage source applied to the first terminal of the second phase control element. In a second embodiment, the controllable electrical signal includes a fixed current source applied to the second terminal of the second phase control element and a controllable current source applied to the first terminal of the second phase control element.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 120 is first located in FIG. 1).

DETAILED DESCRIPTION

Figure 1:
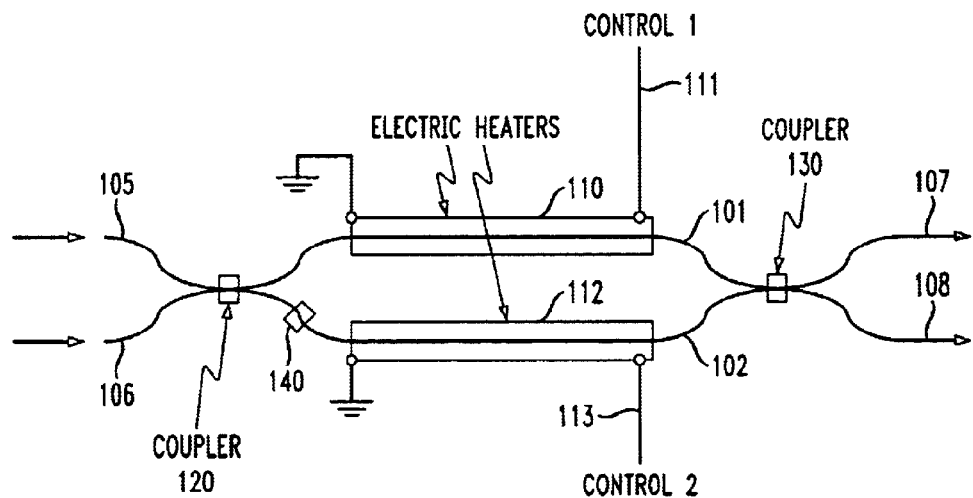
FIG. 1 illustrates the push-pull thermooptic Mach-Zehnder interferometer switch shown and described in my above-identified patent application.

With reference to FIG. 1, there is shown a diagram illustrating the arrangement of a push-pull thermo-optic Mach-Zehnder interferometer switch for switching or attenuating optical signals as described in my above-identified patent application. One or two input waveguides, such as waveguides 105, 106, are connected to a first coupler 120 that connects the optical signal to two waveguides or paths 101, 102 that advantageously have a path-length difference between one eighth and three eighths of an optical wavelength. This path length difference can be obtained, for example, by including an "extra" path length, shown illustratively as element 140 in FIG. 1, in path 102. Waveguides or paths 101, 102 are connected to a second coupler 130 that in turn couples the coupler outputs to one or two output waveguides, such as waveguides 107, 108. In accordance with the invention, two electric heaters 110, 112 are disposed, one on each of the waveguides 101, 102. The heaters 110, 112 are both driven, not necessarily simultaneously, by electrical control (drive) signals received on control inputs 111 and 113, respectively, to control the optical transmissivity through the device in such a manner that one arm is driven or switched to one state, and the other arm is driven or switched to the other state. In this way, the overall device operates in a push-pull mode. There are many benefits of a push-pull M-Z switch including reduced power consumption, constant power dissipation, reduced polarization dependence and constant phase.

For a thermooptic switch, the electric power consumed is proportional to the applied phase shift. To switch a conventional M-Z switch, where only one thermooptic phase shifter is used (only one arm, e.g., 101, has a heater), a phase shift of 180 degrees is required. With no control signal applied to the conventional M-Z switch, each arm has the same phase shift (since in this state the thermooptic phase shifter has a phase shift of zero degrees) and the signals from the arms are combined to form the switch output signal. This is referred to as the "bar" state of the M-Z switch. When the control signal is applied the thermooptic phase shifter has a phase shift of 180 degrees and when the 180 degree out of phase arm signals are combined at the output coupler (e.g., 130), they cancel each other producing essentially no switch output signal. This is referred to as the "cross" state of the M-Z switch.

In comparison, to switch a push-pull M-Z switch, where a thermooptic phase shifter is used in each arm, the phase shift in each arm is switched only 90 degrees. When a control signal (CONTROL 1) is applied on lead 111 and no control signal (CONTROL 2) is applied on lead 113, arm 101 and arm 102 (because of the element 140) both add a +90 degree phase shift to the applied input optical signals at leads 105 and/or 106. Since the resulting differential phase shift between the two arms 101, 102 is zero, the signals from the arms are combined to form a switch output signal (107, 108). This is the bar state where optical signals pass through the M-Z switch. When no control signal (CONTROL 1) is applied on lead 111 and a control signal (CONTROL 2) is applied on lead 113, arm 101 has a zero degree phase shift and arm 102 has a +180 degree phase shift (+90 degrees from the thermooptic phase shifter 110, 101 and +90 degrees from element 140). In this condition, the differential phase shift between the signals of arms 101 and 102 is 180 degrees and they cancel and produce no substantial switch output signal (107, 108). This is the cross state where no optical signals pass through the M-Z switch. Since in a push-pull M-Z switch of FIG. 1, the thermooptic phase shifter in each arm is switched only 90 degrees, rather than 180 degrees in the conventional M-Z switch, the power consumption of the push-pull M-Z switch is reduced by up to a factor of two.

Figure 2:
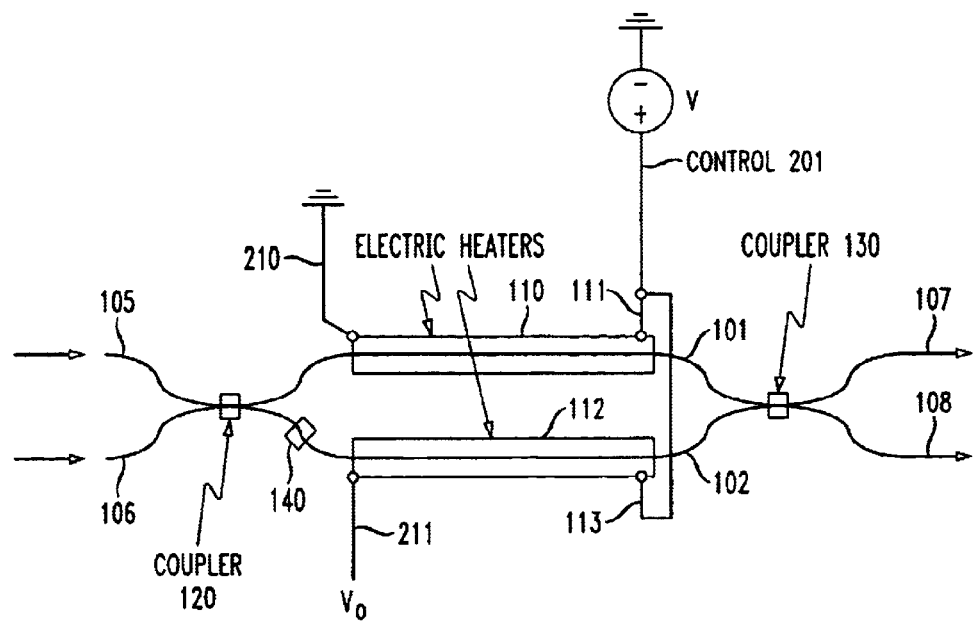
FIG. 2 shows, in accordance with the present invention, an illustrative push-pull thermooptic Mach-Zehnder interferometer switch which uses only one control lead for providing one voltage drive signal per switch.

With reference to FIG. 2 there is shown, in accordance with the present invention, an illustrative push-pull thermooptic Mach-Zehnder interferometer switch which uses only one control lead and one voltage drive signal per switch. In the FIG. 2 description, element designations that are identical to those of FIG. 1 function in the same manner as those described in FIG. 1. In FIG. 2, the control signal (V) 201 is applied via a single control lead 201 that connects to leads 111 and 113 at one end of heaters 110 and 112, respectively. The second lead 210 of heater 110 connects to ground potential, while the second lead 211 of heater 112 is connected to a fixed voltage $V_0$. Thus, a single controllable electrical signal, including control signal (V) and fixed voltage $V_0$, is applied across the terminals 113 and 211 of heater 112. The operation of the M-Z interferometer switch of FIG. 2 is as follows.

When the control signal 201 is at a first voltage level (e.g., zero volts), there is no current flow through heater 110 and the thermooptic phase shifter 1 (heater 110 and arm 101) of the first arm 101 produces a phase shift of zero degrees. However, the first voltage level (e.g., zero volts) causes a current flow through heater 112 and, hence, the thermooptic phase shifter 2 (heater 112 and second arm 102) of arm 102 produces a phase shift of +90 degrees. The resulting optical phase shift through arm 102 is 180 degrees which is the sum of the +90 degrees of the "extra" path element 140 plus the +90 degrees of the thermooptic phase shifter 2 of arm 102. Since, the optical signals through arms 101 and 102 are out of phase, 180 degrees different, they essentially cancel each other at output coupler 130 thereby forming no switch output signal (107, 108). This condition is the "cross" or "shuttered" state of M-Z interferometer switch of FIG. 2.

When the control signal 201 is at a second voltage level (e.g., $V_0$ volts), there is a current flow through heater 110 and the thermooptic phase shifter 1 (heater 110 and arm 101) of arm 101 produces a phase shift of +90 degrees. However, when the first voltage level (e.g., $V_0$ volts) is applied to lead 113 of heater 112 no current flows since lead 211 is also at the $V_0$ volts. Hence, the thermooptic phase shifter 2 (heater 112 and arm 102) of arm 102 produces a phase shift of zero degrees. The resulting optical phase shift through arm 102 is 90 degrees which is the sum of the +90 degrees of the "extra" path element 140 plus the zero degrees of the thermooptic phase shifter 2 of arm 102. Since the optical signals through arms 101 and 102 both undergo a phase shift of +90 degrees they remain in-phase and hence are combined at output coupler 130, thereby forming a switch output signal (107, 108). This condition is the "bar" state of M-Z interferometer switch of FIG. 2.

In this manner, the M-Z interferometer switch of FIG. 2 uses a single control lead 201 to apply a control drive signal V of either zero or $V_0$ volts to switch (or shutter) the optical signal received over input leads 105 and 106 between the "cross" and "bar" states, respectively. While FIG. 2 shows the use of positive voltage levels for V and $V_0$, it should be noted that negative voltages could also be used. Since the M-Z interferometer switch of FIG. 2 uses only one control lead, only one drive circuit (not shown) is needed to provide the controllable voltage drive signal V over that one control lead. Note that the total power to the M-Z switch is constant when V is at either zero volts or $V_0$ volts. However, when the voltage V is between $0<V<V_0$, the power is not constant. Thus, the M-Z switch power consumption is not constant while V is being switched between the zero and $V_0$ volt levels. Note also that the overall phase in arm 101 varies from 0 to +90 degrees while the overall phase in arm 102 goes from +180 to +90. Thus while the change in phase is 90 degrees for both arm 1 and arm 2, the overall phase of the M-Z switch is not constant.

Figure 3:
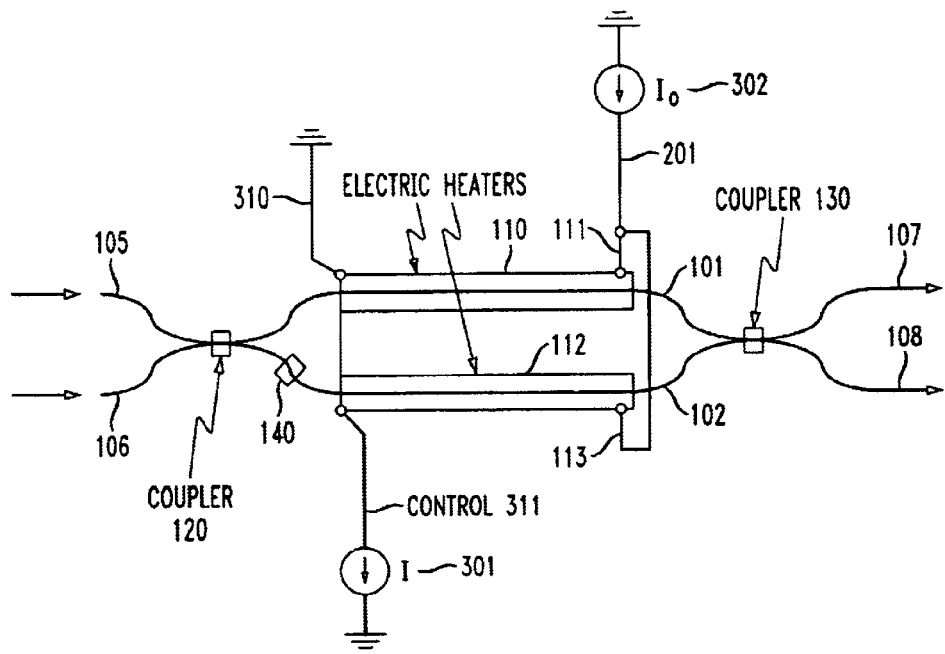
FIG. 3 shows another embodiment of my invention, where an illustrative push-pull thermooptic Mach-Zehnder interferometer switch uses only one control lead for providing one current drive signal per switch.

With reference to FIG. 3 there is shown, another illustrative embodiment of my push-pull thermooptic M-interferometer switch that uses only one control lead and one current drive signal per switch. In the FIG. 3 description, element designations that are identical to those of FIG. 1 function in the same manner as those described in FIG. 1. In FIG. 3 the control signal 302 is a current signal rather than voltage control signal 201 used in FIG. 2. In FIG. 3, the single control current signal (I) is applied in series with the heater 112. The fixed current signal ($I_0$) is applied to lead 111 of heater 110 and lead 113 of heater 112. The second lead 310 of heater 110 is connected to ground. Thus in FIG. 3, a single controllable electrical signal, including control current signal (I) and fixed current signal ($I_0$), is applied across the terminals 113 and 211 of heater 112. The operation of the M-Z interferometer switch of FIG. 3 is described below.

When the control current signal source (I) 301 is at a first current level (e.g., zero amps), the current flow through heater 110 is equal to $I_0$, from the fixed current source ($I_0$) 302. Hence the thermooptic phase shifter 1 (heater 110 and arm 101) of arm 101 produces a phase shift of +90 degrees. However, since control current signal source (I) 301 is at zero amps (the first current level) no current flow through heater 112 and, hence, the thermooptic phase shifter 2 (heater 112 and arm 102) of arm 102 produces no phase shift. The resulting optical phase shift through arm 102 is +90 degrees which is the sum of the +90 degrees of the "extra" path element 140 plus the zero degrees of the thermooptic phase shifter 2 of arm 102. Since the optical signals through arms 101 and 102 both undergo a phase shift of +90 degrees they remain in-phase and hence are combined at output coupler 130 thereby forming a switch output signal (107, 108). This condition is the "bar" state of M-Z interferometer switch of FIG. 3.

When the current signal source (I) 301 is at a second current level (e.g., $I_0$ amps) it receives all of the current 10 from fixed source 302, and hence, no current flows through heater 110. With no current flow through thermooptic phase shifter 1 (heater 110 and arm 101) of arm 101 produces a phase shift of zero degrees. Since the current signal source (I) 301 is at $I_0$ amps, this current flows through heater 112 and, hence, thermooptic phase shifter 2 (heater 112 and arm 102) of arm 102 produces a +90 degree phase shift. The resulting optical phase shift through arm 102 is +180 degrees which is the sum of the +90 degrees of the "extra" path element 140 plus the +90 degrees of the thermooptic phase shifter 2 of arm 102. Since the optical signals through arms 101 has a zero degree phase shift while arm 102 undergoes a +180 degree phase shift, these signals are out of phase and cancel each other at output coupler 130 thereby producing no switch output signal (107, 108). This condition is the "cross" state of M-Z interferometer switch of FIG. 3.

In this manner, the M-Z interferometer switch of FIG. 3 uses a single control lead 311 to apply a control current drive signal of zero amps or $I_0$ amps to switch (or shutter) the optical signal received over input leads 105 and 106 between the "cross" and "bar" states, respectively. While FIG. 3 shows the use of positive current levels for I and $I_0$, it should be noted that negative voltages could also be used. Since the M-Z interferometer switch of FIG. 3 uses only one control lead, only one current drive circuit (not shown) is needed to provide the controllable current drive signal I over the one control lead 311. Note that the total power to the M-Z switch is constant when I is at either zero or $I_0$ amps. However, when the voltage I is between $0<I<I_0$, the power is not constant. Thus, the M-Z switch power consumption is not constant while the current I is being switched between the zero and $I_0$ current levels. Note also that the overall phase in arm 101 varies from 0 to +90 degrees while the overall phase in arm 102 goes from +180 to +90. Thus the overall phase of the M-Z switch of FIG. 3 is not constant.

Figure 4:
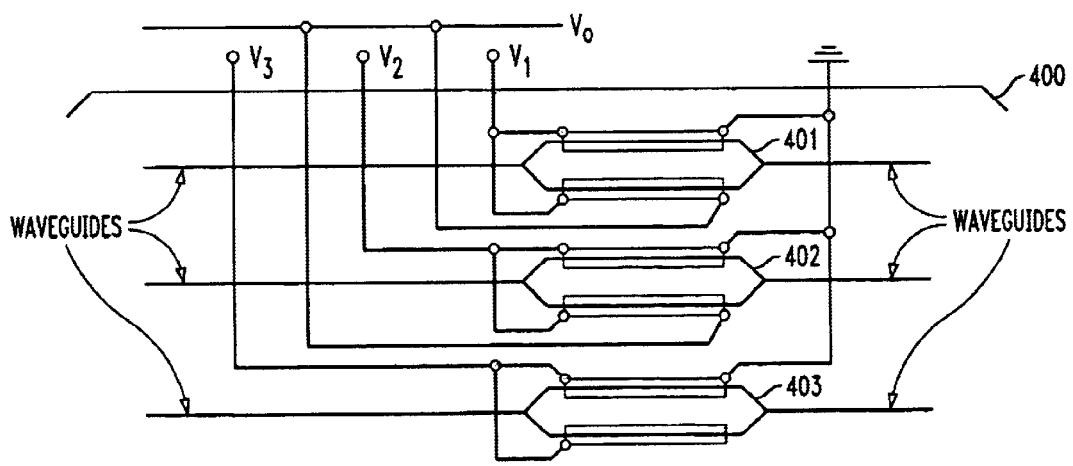
FIG. 4 shows an illustrative design of an array of push-pull thermooptic interferometer switches and the connection of control leads and drive signals to the switches of the array.

FIG. 4 shows an illustrative design of an arrangement for providing the connections of voltage control leads and drive signals to each of the push-pull thermooptic interferometer switches 401–403 of a planar array 400. As shown, the array includes three M-Z switches 401, 402, 403, which are controlled, respectively, by control voltage leads V1, V2, V3. A common fixed voltage lead $V_0$ and a common ground lead 404 are used to provide the fixed voltages needed for the operation of the switch array. Note that the lead connection layout of FIG. 4 is planar since no lead crossovers are needed. If the array of M-Z switches utilized current drive, as shown in FIG. 3, the arrangement of FIG. 4 may be adapted in a similar manner (where Vo becomes $I_0$; V1, V2, V3 become I1, I2, and I3; etc.) to produce a planar lead connection layout without crossovers.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

While this invention has been described above as a digitally controllable device (i.e., control signal 201 is switched between ground and $V_0$, and control signal 311 is switched between zero and $I_0$), one could also use intermediate electrical control signal values to produce partial switching (or attenuation) of the two input optical signals (on input waveguides 105, 106). Such an arrangement would operate as a variable optical attenuator.

I claim:

1. A push-pull driven two-arm thermooptic interferometer switch comprising a first two-terminal phase control element to control the optical phase in a first arm, a first terminal of the first phase control element being connected to a fixed electrical signal, a second two-terminal phase control element to control the optical phase in a second arm, where a second terminal of the second phase control element is connected to the second terminal of the first phase control element, and a single controllable electrical signal applied across the first and second terminals of the second phase control element, wherein the level of the controllable electrical signal controls the optical phase in a first and second arms by controlling the current flow in the first and second arms, respectively.

2. The interferometer switch of claim 1 wherein the single controllable electrical signal includes a controllable voltage source applied to the second terminal of the second phase control element and a fixed voltage source applied to the first terminal of the second phase control element.

3. The interferometer switch of claim 2 wherein the level of the controllable voltage source can be set so that the optical phase in the first phase control element is greater than, equal to, or less than the optical phase in the second phase control element.

4. The interferometer switch of claim 2 wherein when the controllable voltage source is at a first level the optical phase in the first phase control element is 90 degrees and the optical phase in the second phase control element is zero degrees and when the controllable voltage source is at a second level, the optical phase in the first phase control element is zero degrees and the optical phase in the second phase control element is 90 degrees.

5. The interferometer switch of claim 2 wherein the fixed electrical signal is a ground voltage signal, the fixed voltage source is a second voltage signal greater than the ground voltage signal, and the controllable voltage signal can be switched between the ground voltage signal and the second voltage signal.

6. The interferometer switch of claim 1 wherein the controllable electrical signal includes a fixed current source applied to the second terminal of the second phase control element and a controllable current source applied to the first terminal of the second phase control element.

7. The interferometer switch of claim 6 wherein the level of the controllable current source can be set so that the optical phase in the first phase control element is greater than, equal to, or less than the optical phase in the second phase control element.

8. The interferometer switch of claim 6 wherein when the controllable current source is at a first level the optical phase in the first phase control element is 90 degrees and the optical phase in the second phase control element is zero degrees and when the controllable voltage source is at a second level, the optical phase in the first phase control element is zero degrees and the optical phase in the second phase control element is 90 degrees.

9. The interferometer switch of claim 6 wherein the fixed electrical signal is a ground voltage signal, the fixed current source is a non-zero current level, and the controllable current source can be switched between a zero current level and the non-zero fixed current level.

10. The interferometer switch of claim 1 being implemented as a planar device where connections between the fixed electrical signal to the first terminal of first phase control element and between the controllable electrical signal and the first and second terminals of the second phase control element are arranged without the use of a crossover path.

11. The interferometer switch of claim 1 being part of a switch array formed using a plurality of such interferometer switches and wherein each type of fixed electrical signal utilized by each of the interferometer switches is derived from a common electrical source for that electrical signal type.

12. The array of switches of claim 11 where all of the electrical connections are made in a planar arrangement without the use of crossovers.

* * * * *